United States Patent [19]
Egli

[11] 4,176,991
[45] Dec. 4, 1979

[54] HINGED TOOL HOLDER

[76] Inventor: Henry O. Egli, Riverside Dr., Sidney, N.Y. 13838

[21] Appl. No.: 889,234

[22] Filed: Mar. 23, 1978

[51] Int. Cl.² ............................................. B23B 31/10
[52] U.S. Cl. .................................. 408/239 R; 279/33; 279/44; 408/238
[58] Field of Search ............... 408/231, 238, 239, 199; 279/33, 34, 35, 19.1, 19.2, 1.13, 44, 77, 83, 106; 269/126, 127

[56] References Cited

U.S. PATENT DOCUMENTS

| | | | |
|---|---|---|---|
| 474,312 | 5/1892 | Abbott | 279/33 |
| 2,355,286 | 8/1944 | Fink | 279/44 |
| 2,630,327 | 3/1953 | Landauer | 279/44 |
| 2,954,182 | 9/1960 | Bojanower | 279/1 R X |
| 3,022,084 | 2/1962 | Dresback | 408/239 X |
| 3,851,869 | 12/1974 | Damewood | 269/127 X |

FOREIGN PATENT DOCUMENTS

| | | |
|---|---|---|
| 655312 | 1/1938 Fed. Rep. of Germany | 408/238 |
| 850837 | 7/1952 Fed. Rep. of Germany | 408/238 |

OTHER PUBLICATIONS

"Hinged Drill Socket" by H. Moore, p. 110, *American Machinist* Jul. 31, 1947.

*Primary Examiner*—William R. Briggs
*Attorney, Agent, or Firm*—Ostrolenk, Faber, Gerb & Soffen

[57] ABSTRACT

A clamp for a tool spindle for rapid interchange of tools without the need to raise the spindle or lower the work further than the end of the tool to allow clearance. The clamp is provided with a recess co-axial with spindle and the tool is provided with an adapter extension movable into the recess in a direction normal to the axis of the spindle or recess. A clamping gate hinged at one side of the recess is then locked to the other side of the recess to complete the recess and lock the tool adapter in position. A locking screw on the gate is then rotated into engagement with a flat on the adapter to integrate the clamping unit and tool. Means are also provided for axial positioning of the tool.

2 Claims, 5 Drawing Figures

HINGED TOOL HOLDER

The present invention relates to a tool holding mechanism which is so arranged that a plurality of cutting tools can be rapidly interchanged without the need to raise the machine spindle or lower the work table to provide clearance. Essentially the invention contemplates the arrangement of the tool holder so that a tool may be removed and inserted in a direction perpendicular to the axis of operation of the tool holder thereby making it unnecessary to provide excess clearance and excess manipulation of the machine elements in order to effect the interchange.

The present invention has as its primary object, therefore, the arrangement of a tool holder and clamp which may be mounted on the spindle of a machine and wherein the clamp member is so arranged that it essentially comprises an element secured to the spindle and a hinged element which is hinged along the side of the tool holder so that it may be opened in door-like fashion to permit removal of a tool already on the spindle and to permit insertion and clamping of a new tool in place thereof.

The foregoing and many other objects of the present invention will become apparent in the following description and drawings in which.

Figures 1, 2, 3:
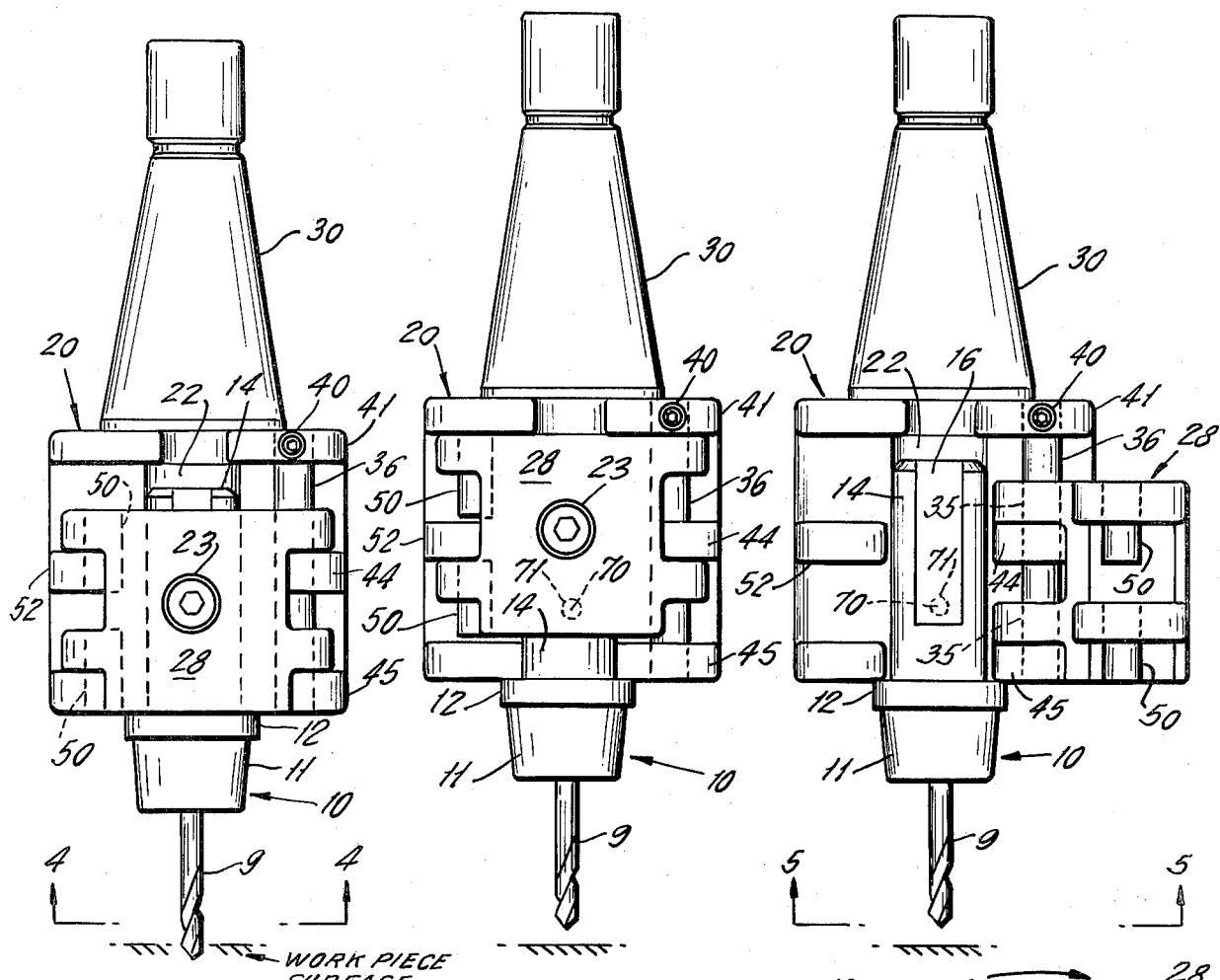
FIG. 1 is a view in elevation the novel tool holder of the present invention with the adapter in place and the tool clamped in position and ready to operate.
FIG. 2 is a view corresponding to that of FIG. 1 showing the tool withdrawn from the workpiece either by a lowering of the table on which the workpiece is located or by a raising of the spindle. By this means the tool is positioned so that the operating member or bit may be removed and replaced.
FIG. 3 is a view corresponding to that of FIG. 2 showing the clamp operated to permit withdrawal of the bit or tool and replacement thereof.

Referring now to the drawings each bit, tool or other device 9 which is to be used in connection with the present invention is provided with an adapter 10 secured thereto in any suitable manner. The adapter 10 has a bottom section 11 which engages the tool 9 and which is provided with a collar 12 which, when the tool is inserted, is brought up against the bottom of the clamping member 20. The adapter 10 is also provided with the upwardly extending post 14 which is received in the recess 22 of the clamp 20. The extension 14 is provided with a flat 16 (see FIGS. 3 and 4) against which the lock screw 23 carried by the clamp 20 may be driven in order to secure the adapter 10 and the tool 9 as well as the extension 14 when placed in the clamp 20.

The clamp 20 is secured to the spindle adapter 30 for the machine in any suitable manner. The clamp 20 comprises a principal section 25 which is the element that is secured to the machine spindle 30. The principal member 25 is semi-circular and forms part of the recess 22 in the clamp previously described in connection with FIG. 3 (see also FIGS. 4 and 5). The principal member 25 has secured thereto as hereinafter described a side door or clamping gate 28.

The clamping door or gate 28 is provided with a plurality of vertically spaced openings 35 through which hinge pin 36 may pass. Pin 36 is secured in any suitable manner as by the set screw 40 to the top extension 41 of the principal clamp member 25 and passes through the supporting ears 44, 45 of the clamp section 25.

Figure 4:
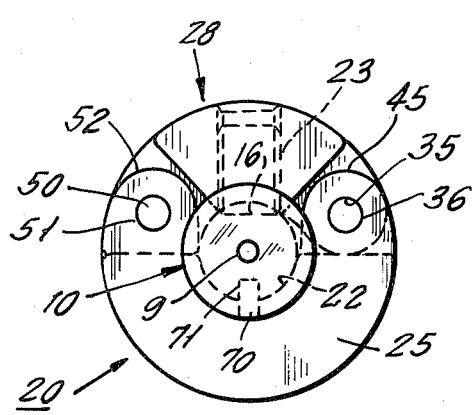
FIG. 4 is a view partly in section taken from line 4—4 of FIG. 1 looking in the direction of the arrows showing the clamping position.
Figure 5:
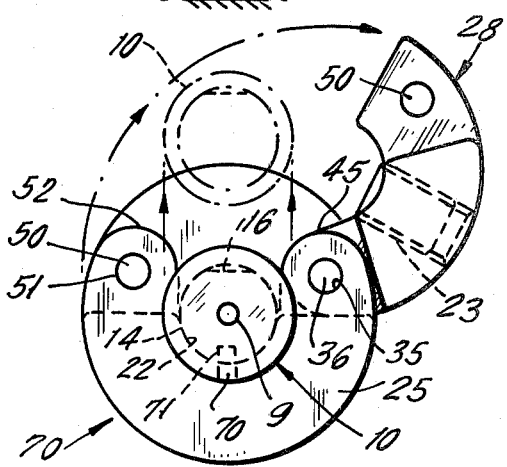
FIG. 5 is a view corresponding to that of FIG. 4 but taken with respect to line 5—5 of FIG. 3 looking in the direction of the arrows and showing the clamp in the "open-door" position to permit replacement of the tool.

The door or clamping gate 28 may be rotated on the pin 36 from the position shown in FIG. 4 to the position shown in FIG. 5. It will also be seen that because of the difference in height between the door or gate 28 and the pin 36, the door or gate 28 may be moved vertically from the position shown in FIG. 1 to the position shown in FIG. 2 and back again to the position shown in FIG. 3. The gate may be swung as shown between the positions of FIGS. 4 and 5. The clamping door or gate 28 is provided with the locking pins 50, at the end thereof opposite the pivot pin 36. When the door or gate 28 is raised from the position of FIG. 1 to the position of FIG. 2, the locking pins 50 are disengaged from openings 51 in the extensions 52 of the clamp 25 on the opposite side from the extensions 44, 45 thereof so that the pins 50 clear the extensions 52. The gate 28 may now be swung from the position of FIGS. 1 and 4 to the positions of FIGS. 3 and 5.

The clamping door or gate 28 may now slide down the pin 36 to the position shown in FIG. 3 where a portion of the door or gate rests on the supporting ears 44, 45. The adapter 10 and the tool 9 carried thereby may be withdrawn and a different adapter and tool may be inserted. The clamping door or gate 28 is then raised and rotated from the position of FIG. 3 to the position of FIG. 2. The clamping door or gate 28 is dropped to the closed position FIG. 1 and lock screw 23 tightened to secure adapter 10. It will be understood that the spindle adapter 30 is installed in a mating receptacle once only and is not operated when changing tools.

When the lock screw 23 is rotated against the flat 16 of the adapter it locks the adapter 10 and the tool 9 in place in the position shown in FIGS. 1 and 4. When the lock screw 23 is loosened, then the clamping door or gate 28 may be raised from the position shown in FIGS. 1 and 4 to the position shown in FIG. 2, wherein the locking door or gate 28 may now be rotated to the position shown in FIG. 3 and 5.

By this means therefore a tool and adapter combination 9 and 10 may readily be inserted and removed from the clamping member 20 by a motion normal to the axis of the spindle adapter 30 thereby eliminating the extent to which the spindle adapter 30 must be moved axially with respect to the table (or vice versa) in order to provide clearance for the changing of tools.

In other words, the tool is inserted sideways into the clamp past the hinge door and clamped in position, first, by the locking of the door by interengagement of the pins 50 with the extensions 52 of the clamp body shown in FIG. 1, and, then, by the engagement of the locking screw 23 against the flat 16 of the adapter 10.

In order to permit a tool such as the bit 9 or any other tool to be appropriately preset for its correct longitudinal axial position in the clamp 28, the main body 25 of the clamp is provided with a pin 70 which is pressed fitted into the main body and extends into recess 22. Each adapter is provided with a mating hole 71 to establish the desired axial position of the cutting tool point. By this means, therefore, all tools may be preset outside the tool holder and will be positioned to assume the same axial location each time the adapter carrying that tool is inserted in the tool holder. The pins 70 engaging in the mating hole 71 also serves to prevent the adapter from dropping out from the body 25 of a clamp while the clamp is being opened or closed.

The utilization of this type of door or hinged clamp or gate type of clamp greatly reduces the need for longitudinal movements of the machine tool slides to effect insertion or removal of a cutting tool. Machines provided with a limited longitudinal spindle travel; therefore it is a distinct advantage to eliminate consumption of travel to effect tool change. After the tool is removed from the workpiece it may be removed in a direction perpendicular to the axis and no additional height is required.

In the foregoing the present invention has been described in connection with preferred illustrative embodiments thereof. Since many variations and modifications will now be obvious to those skilled in the art, it is preferred that the scope of this invention be defined, not by the specific disclosures herein contained but, by the appended claims.

I claim:
1. In a machine having an operating spindle, a clamp carried by said spindle for supporting a tool co-axially with said spindle;
   said clamp having a main body secured to said spindle;
   a recess in said main body co-axial with said spindle;
   said main body having one section defining said recess and another section comprising a gate hingedly mounted on one side of said main body and rotatable at the side of said main body in a plane normal to said recess to close said recess;
   means on the other side of said main body for locking said gate in place; and
   a tool having an extension receivable in said recess by movement of said extension in a direction normal to the axis of said recess when said gate is open;
   means for positioning said extension axially in said recess; and
   means for securing said extension in said recess;
   said means for securing said extension in said recess comprising a lock screw in said gate extendable into said recess and a flat section on said extension against which said lock screw may bear;
   the means for positioning said extension axially in said recess comprising a member extending into said recess from a wall of one of said extension and recess and a corresponding opening in the other of said extension and recess for receiving said member;
   said hinged mounting of said gate comprising a pin carried by said main body parallel to the axis of said recess; said gate having a plurality of openings rotatable and slidable on said pin; and
   the side of the gate opposite said hinged mounting having a plurality of pins extending parallel to the axis of said recess and the corresponding side of the housing having a plurality of openings adapted to slidably receive said pins on movement of said gate in a direction parallel to the axis of said recess and to lock said gate.
2. The clamp of claim 1 wherein said gate is locked in closed position and the extension of said tool is locked in position by said locking screw engaging said flat on said extension.

* * * * *